(12) United States Patent
Fu

(10) Patent No.: US 9,904,622 B2
(45) Date of Patent: Feb. 27, 2018

(54) CONTROL METHOD FOR NON-VOLATILE MEMORY AND ASSOCIATED COMPUTER SYSTEM

(71) Applicant: Acer Incorporated, New Taipei (TW)

(72) Inventor: Tz-Yu Fu, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 227 days.

(21) Appl. No.: 14/930,088

(22) Filed: Nov. 2, 2015

(65) Prior Publication Data

US 2017/0031811 A1  Feb. 2, 2017

(30) Foreign Application Priority Data

Jul. 30, 2015  (TW) .................................. 104124681

(51) Int. Cl.
*G06F 12/10* (2016.01)
*G06F 12/02* (2006.01)
*G06F 3/06* (2006.01)
*G06F 13/42* (2006.01)

(52) U.S. Cl.
CPC .......... *G06F 12/0246* (2013.01); *G06F 3/061* (2013.01); *G06F 3/0655* (2013.01); *G06F 3/0688* (2013.01); *G06F 13/4282* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 2014/0082276 A1* | 3/2014 | Suzuki | G06F 12/0866 711/113 |
| 2017/0068456 A1* | 3/2017 | Toge | G06F 3/0605 |
| 2017/0132074 A1* | 5/2017 | Zhang | G06F 11/1068 |

\* cited by examiner

*Primary Examiner* — John A Lane
(74) *Attorney, Agent, or Firm* — McClure, Qualey & Rodack, LLP

(57) ABSTRACT

A control method for a non-volatile memory in a computer system is provided. The computer system includes a central processing unit; a system memory; a first memory controller; and a storage device including a non-volatile memory and a second memory controller for controlling access to the non-volatile memory. The method includes the steps of: utilizing the first memory controller to divide the system memory into a first data pool and a second data pool, wherein the first data pool stores temporary data for accessing the storage device by the central processing unit, and the second data pool stores flash translation layer data for use by the second memory controller; and when the central processing unit is to access the storage device, utilizing the second memory controller to access the non-volatile memory according to the flash translation layer data from the second data pool.

10 Claims, 2 Drawing Sheets

CONTROL METHOD FOR NON-VOLATILE MEMORY AND ASSOCIATED COMPUTER SYSTEM

CROSS REFERENCE TO RELATED APPLICATIONS

This Application claims priority of Taiwan Patent Application No. 104124681, filed on Jul. 30, 2015, the entirety of which is incorporated by reference herein.

BACKGROUND OF THE INVENTION

Field of the Invention

The present invention relates to a computer system, and, in particular, to a control method for a non-volatile memory and an associated computer system.

Description of the Related Art

The transmission speed of storage devices in computer systems has become faster and faster thanks to advances in related technology. For example, a solid-state disk (SSD) is a non-volatile memory capable of rapidly accessing data. Recently, a transmission standard, e.g. Advanced Host Controller Interface (AHCI), Non-volatile Memory Express (NVMe), etc., for non-volatile memories has been proposed by the manufacturers of computer systems. The AHCI and NVMe standards provide interface standards for instruction sets, accessing flash memories, register transfer levels, and driver levels.

Specifically, the NVMe standard is a new storage device controller providing better usage of system resources than the AHCI standard, such as delivering instructions using multi-cores of the computer system, and reducing unnecessary accessing of registers. However, the performance of the NVMe standard is still limited by NAND flash storage devices since random accessing of the NAND flash storage devices is not fast enough (e.g. about 50 us), thus the NAND flash storage devices cannot replace the dynamic random access memory (DRAM) to communicate with the central processing unit (CPU), and has to store the data required by the system into the host memory via direct memory access (DMA) (e.g. accessing time is about 30 us), and the CPU then accesses the data stored in the host memory.

In order to address the aforementioned issue, the NVMe standard has defined a new function of a host memory buffer. For example, a DRAM is employed on the controller of a conventional solid-state disk to ensure fast data-access speed. The new function defined in the NVMe standard may use the host memory in the computer system to replace the DRAM in the SSD controller. However, there are still some limitations in the aforementioned new function defined in the NVMe standard since the host memory buffer is primarily for I/O access, and it cannot permanently store general data. That is, the specific data has to be written to the host memory via the NVME controller. It should be noted that the aforementioned data-accessing operation performed by the NVME controller is different from that performed by the DMA controller. The DMA controller writes data into a data pool accessible to the CPU, but the host memory buffer is used to store the data which are further written into the data pool accessible to the NVMe controller.

BRIEF SUMMARY OF THE INVENTION

A detailed description is given in the following embodiments with reference to the accompanying drawings.

In an exemplary embodiment, a computer system is provided. The computer system includes: a central processing unit; a system memory; a first memory controller for controlling access to the system memory; and a storage device, comprising: a non-volatile memory; and a second memory controller for controlling access to the non-volatile memory. The first memory controller divides the system memory into a first data pool and a second data pool, and first data pool stores temporary data for accessing the storage device by the central processing unit. The second data pool stores flash translation layer data for use by the second memory controller. When the central processing unit is to access the storage device, the second memory controller accesses the non-volatile memory according to the flash translation layer data from the second data pool.

In another exemplary embodiment, a control method for a non-volatile memory for use in a computer system is provided. The computer system comprises a central processing unit; a system memory; a first memory controller for controlling access to the system memory; and a storage device comprising a non-volatile memory and a second memory controller for controlling access to the non-volatile memory. The method includes the steps of: utilizing the first memory controller to divide the system memory into a first data pool and a second data pool, wherein the first data pool stores temporary data for accessing the storage device by the central processing unit, and the second data pool stores flash translation layer data for use by the second memory controller; and when the central processing unit is to access the storage device, utilizing the second memory controller to access the non-volatile memory according to the flash translation layer data from the second data pool.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
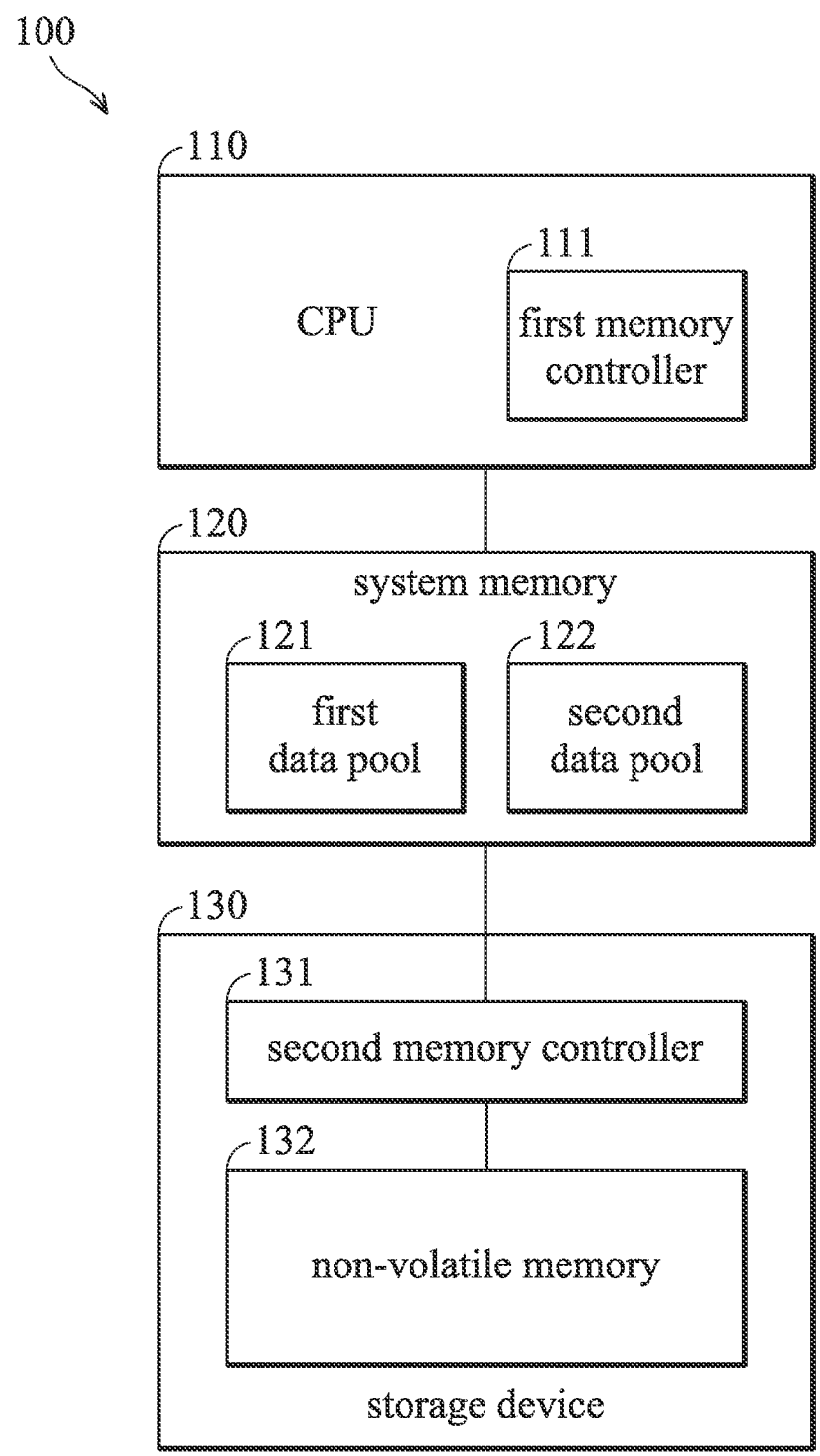
FIG. 1 is a block diagram of a computer system in accordance with an embodiment of the invention.

FIG. 1 is a block diagram of a computer system in accordance with an embodiment of the invention. In an embodiment, the computer system 100 includes a CPU 110, a system memory 120, and a storage device 130. In an embodiment, the CPU 110 further includes a first memory controller 111, configured to control access to the system memory 120, wherein the system memory 120 may be a dynamic random access memory (DRAM). In an alternative embodiment, the first memory controller 111 is independent from the CPU 110. The storage device 130 includes a second memory controller 131 and a non-volatile memory 132, where the NVMe standard is supported by the second memory controller 131, and the non-volatile memory 132 may be an NAND flash memory, but the invention is not limited thereto. In addition, the system memory 120 and the storage device 130 communicate with each other through the PCI Express bus.

In an embodiment, the first memory controller 111 divides the system memory 120 into a first data pool 121 and a second data pool 122. When the CPU 110 writes data into the storage device 130, the CPU 110 first writes temporary data into the first data pool 121 (e.g. for accessing by the DMA controller) of the system memory 120 via the first memory controller 111, and the second memory controller 131 retrieves the temporary data from the first data pool 121, and writes the retrieved temporary data into the non-volatile memory 132.

It is understood that the second memory controller 131 writes data into the non-volatile memory 132 via a flash translation layer (FTL), and the flash translation layer is configured to provide mapping between the file system of the operating system and the physical data layer of the non-volatile memory 132, so that the operating system may view the same file system as a common hard disk.

In an embodiment, the second data pool 122 in the system memory 120 is for accessing by the second memory controller 131. Specifically, the FTL data can be written into the second data pool 122, and thus the transmission speed for accessing the FTL data can be significantly increased. For example, the bandwidth of a DDR DRAM employed on the second memory controller 131 is about 1.6 GB/s in prior techniques. However, the FTL data are written into the second data pool 122 in the invention, and the transmission speed for accessing the data in the second data pool 122 can reach 4 GB/s. In another embodiment, the second data pool 122 can also be used to store the user's data (e.g. general data). When the second memory controller 131 has received read instructions from the CPU 110, it is unnecessary to transmit data to the system memory 120 from the storage device 130 through the PCIe bus and then retrieve data from the system memory 120, so that the first memory controller 111 may directly read data from the second data pool 122.

In addition, each time the CPU 110 is to write data to the storage device 130, the second memory controller 131 receives write instructions from the CPU 110. Meanwhile, the second memory controller 131 may transmit a hint message to the first memory controller 111, and write the required FTL data stored in the second data pool 122 to the first data pool 121 via the first memory controller 111. Accordingly, the second memory controller 131 may retrieve the data to be written into the storage device 130 and the associated FTL data from the first data pool 121, and write the data into the non-volatile memory 132 according to the retrieved FTL data. Briefly, the system memory 120 can be used to store the FTL data in the invention, and an additional DRAM is not required in the storage device 130.

In an embodiment, when the second memory controller 131 is accessing data, the mapping relationship between the file locations and physical data layer may also change, and the second memory controller 131 may update the FTL data at any time. However, in order to ensure the consistency of the data, the second memory controller 131 simultaneously "writes through" the data into the second data pool 122 of the system memory 120 and the non-volatile memory 132.

Figure 2:
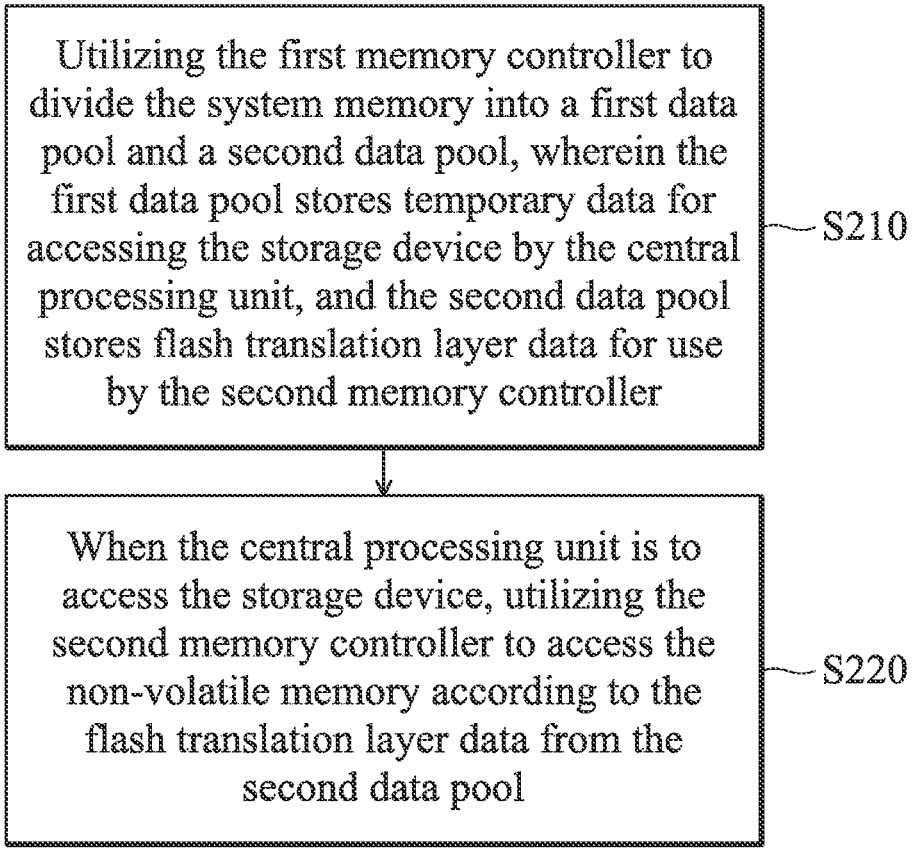
FIG. 2 is a flow chart of a control method for a non-volatile memory for use in a computer system in accordance with an embodiment of the invention.

FIG. 2 is a flow chart of a control method for a non-volatile memory for use in a computer system in accordance with an embodiment of the invention. In step S210, the first memory controller 111 is utilized to divide the system memory 120 into a first data pool 121 and a second data pool 122, wherein the first data pool 121 stores temporary data for accessing the storage device 130 by the CPU 110, and the second data pool 122 stores FTL data for use by the second memory controller 131. In step S220, when the CPU 110 is to access the storage device 130, the second memory controller 131 accesses the non-volatile memory 132 of the storage device 130 according to the FTL data from the second data pool 122.

In view of the above, a control method for a non-volatile memory and an associated computer system are provided. The control method and associated computer system are capable of utilizing the system memory of the computer system to store FTL data and the data stored in the non-volatile memory, so that the CPU or the second memory controller of the storage device may quickly access the required data and associated FTL data with a faster transmission speed, resulting in a higher data-accessing performance.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer system, comprising:
   a central processing unit;
   a system memory;
   a first memory controller for controlling access to the system memory; and
   a storage device, comprising:
   a non-volatile memory; and
   a second memory controller for controlling access to the non-volatile memory;
   wherein the first memory controller divides the system memory into a first data pool and a second data pool, and first data pool stores temporary data for accessing the storage device by the central processing unit, and the second data pool stores flash translation layer data for use by the second memory controller,
   wherein when the central processing unit is to access the storage device, the second memory controller accesses the non-volatile memory according to the flash translation layer data from the second data pool.

2. The computer system as claimed in claim 1, wherein when the central processing unit is to write the temporary data to the storage device, the first memory controller writes the flash translation layer data from the second data pool to the first data pool, and the second memory controller retrieves the temporary data and the flash translation layer data from the first data pool.

3. The computer system as claimed in claim 1, wherein the second memory controller further copies storage data in the non-volatile memory to the second data pool, and when the central processing unit is to read the storage data from the storage device, the second memory controller transmits a hint message to the first memory controller to copy the storage data in the second data pool to the first data pool, and the central processing unit reads the storage data from the first data pool.

4. The computer system as claimed in claim 3, wherein when the second memory controller updates the flash translation layer data and the central processing unit is to write the temporary data to the storage device, the second memory controller simultaneously writes the temporary data to the second data pool and the non-volatile memory.

5. The computer system as claimed in claim 1, wherein the system memory and the second memory controller communicate with each other through a PCI Express bus.

6. A control method for a non-volatile memory for use in a computer system, wherein the computer system comprises a central processing unit; a system memory; a first memory controller for controlling access to the system memory; and a storage device comprising a non-volatile memory and a second memory controller for controlling access to the non-volatile memory, the method comprising:
   utilizing the first memory controller to divide the system memory into a first data pool and a second data pool, wherein the first data pool stores temporary data for accessing the storage device by the central processing unit, and the second data pool stores flash translation layer data for use by the second memory controller; and
   when the central processing unit is to access the storage device, utilizing the second memory controller to access the non-volatile memory according to the flash translation layer data from the second data pool.

7. The control method as claimed in claim 6, further comprising:
   when the central processing unit is to write the temporary data to the storage device, utilizing the first memory controller to write the flash translation layer data from the second data pool to the first data pool; and
   utilizing the second memory controller to retrieve the temporary data and the flash translation layer data from the first data pool.

8. The control method as claimed in claim 6, further comprising:
   utilizing the second memory controller further to copy storage data in the non-volatile memory to the second data pool;
   when the central processing unit is to read the storage data from the storage device, utilizing the second memory controller to transmit a hint message to the first memory controller to copy the storage data in the second data pool to the first data pool;
   utilizing the central processing unit to read the storage data from the first data pool.

9. The control method as claimed in claim 8, further comprising:
   when the second memory controller updates the flash translation layer data and the central processing unit is to write the temporary data to the storage device, utilizing the second memory controller to simultaneously write the temporary data to the second data pool and the non-volatile memory.

10. The control method as claimed in claim 6, the system memory and the second memory controller communicate with each other through a PCI Express bus.

* * * * *